(12) United States Patent
Abe et al.

(10) Patent No.: US 6,249,668 B1
(45) Date of Patent: Jun. 19, 2001

(54) RADIO PAGER HAVING DIRECTORY STRUCTURE WITH USER-DEFINED NOTIFICATION OF MESSAGE RECEIPT

(75) Inventors: Akihiro Abe; Yasushi Abe; Akihiko Wada; Keiko Ishii, all of Kanagawa (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 09/130,506

(22) Filed: Aug. 6, 1998

(30) Foreign Application Priority Data

Aug. 29, 1997 (JP) .................................................... 9-235022

(51) Int. Cl.[7] ...................................................... H04Q 7/18
(52) U.S. Cl. ...................................... 455/31.3; 340/825.44
(58) Field of Search .............................. lp;1p455/38.4, 455/ 31.1, 31.3; 340/825.44, 825.46

(56) References Cited

U.S. PATENT DOCUMENTS

| | | | |
|---|---|---|---|
| 5,797,098 | * | 8/1998 | Schroeder .............................. 455/464 |
| 5,926,104 | * | 7/1999 | Robinson ......................... 340/825.22 |
| 5,930,399 | * | 7/1999 | Kadyk .................................. 382/245 |
| 5,973,612 | * | 10/1999 | Deo ................................. 340/825.44 |

* cited by examiner

Primary Examiner—William Cumming
Assistant Examiner—Nick Corsaro
(74) Attorney, Agent, or Firm—Pearne & Gordon LLP

(57) ABSTRACT

Messages received through information delivery are classified by a message identification section. The thus-classified messages are stored into a specified folder by means of a folder management section and are managed for each level in a hierarchy. When a new message is stored into the specified folder, a folder setting section causes a paging control section to page the user by means of a speaker, a vibrator, or an LED or causes a display control section to display the arrival of a message on an LCD. So long as the folder is set to a shortcut folder, a desired information item can be read in a prioritized manner.

1 Claim, 5 Drawing Sheets

RADIO PAGER HAVING DIRECTORY STRUCTURE WITH USER-DEFINED NOTIFICATION OF MESSAGE RECEIPT

BACKGROUND OF THE INVENTION

The present invention relates to a radio pager which receives messages by way of an information delivery service provided by an information delivery provider, to an incoming call paging method for use with the radio pager, and to a message reading method for use with the radio pager.

In an existing information delivery service which utilizes a radio pager for selectively paging a user by radio, messages received by the radio pager are classified, divided and stored into hierarchical folders of individual addresses, and the thus-stored messages are managed. The radio pager is selectively set with regard to whether or not to notify the user of the arrival of all incoming information messages for each address each time an incoming message arrives. When the information message stored in a folder is to be read, the address of that information message is selected, and a target folder is selected and determined by retrieving folders in descending order from the highest-order folder to a lower-order folder. Thus, the information message is read.

However, the existing radio pager mentioned above is arranged so as to select whether or not to notify the user of the arrival of all incoming information messages for each address each time an incoming information message arrives. Because of such a configuration, it has been impossible to selectively set the radio pager on a per-field basis in such a way as to notify the user of the arrival of a message in some field but not to notify the user of the arrival of a message in another field. Further, when an incoming message is to be read, folders must be retrieved in descending order from the highest-order folder to a lower-order folder, thus consuming much time to read the message.

SUMMARY OF THE INVENTION

The present invention is aimed at solving such a problem of the existing radio pager, and the object of the present invention is to provide a radio pager, an incoming message paging method, and a message reading method, all of which enable the user to immediately obtain a desired information item by the user being notified of a desired information message or by reading the message on a per-message basis in a prioritized manner.

To accomplish the foregoing object, the present invention causes a paging control section to page the user in a prioritized manner only when a new message is stored into at least one of a plurality of folders or causes a display control section to display the arrival of an incoming message so that the user can become aware of the arrival of the message. Further, so long as a folder into which a desired information item stored is set as a shortcut folder, even in a case where a message is stored into a folder located at a deep level of hierarchical folders pertaining to a certain address, a message stored in a specified folder can be immediately read without retrieval of other folders.

An invention defined in aspect 1 of the present patent application is directed to a radio pager comprising:
  a message identification section for classifying and dividing according to addresses messages delivered by way of an information delivery service;
  a folder management section which stores the thus-divided messages into individual specified folders and manages the messages of an individual folder for each level in a hierarchy;
  means for notifying the user of the arrival of a message; and
  a folder setting section which sets the pager in such a way as to notify the user, in a prioritized manner, of the arrival of an incoming message at a specified folder. The present invention enables the user to be notified of a desired information message or reading of a desired information message, in an individual and prioritized manner.

An invention defined in aspect 2 of the present patent application is directed to an incoming message paging method characterized by the feature that
  when a new message is stored into at least one specified folder of a plurality of folders into which messages delivered by way of an information delivery service are stored, the message is invoked by paging control means in a prioritized manner or a message arrival indication is displayed by a display control section in a prioritized manner. The present invention enables the user to immediately become aware of the arrival of a desired information message.

An invention defined in aspect 3 of the present patent application is directed to a message reading method characterized by the feature that even in a case where a desired information message is stored in a folder located at a lower level hierarchy among folders pertaining to a certain address, a message can be immediately read from a specified folder by setting to a shortcut folder a folder into which a desired information message is stored among hierarchically-managed folders. The present invention enables a desired information message to be immediately read.

According to aspect 4 of the present patent application, the radio pager as defined in aspect 1 is further characterized by the feature that the paging control section is set so as to invoke the message in a prioritized manner or the display control section is set so as to display a message arrival indication in a prioritized manner when at least one folder is specified by way of the folder setting section and a new message is stored in that folder. The present invention enables the user to immediately become aware of the arrival of a desired information message.

According to aspect 5 of the present patent application, the radio pager as defined in aspect 1 is further characterized by the feature that even in a case where a desired information message is stored in a folder located at a lower level hierarchy among folders pertaining to a certain address, a message stored in a specified folder can be immediately read by setting to a shortcut folder a folder into which a desired message is stored by way of the folder setting section. The present invention enables a desired information message to be immediately read.

According to aspect 6 of the present patent application, the radio pager as defined in aspect 1 is further characterized by the feature that the paging control section is set so as to invoke the message in a prioritized manner or the display control section is set so as to display a message arrival indication in a prioritized manner when at least one folder is specified by way of the folder setting section and a new message is stored in that folder; and such that even in a case where a desired information message is stored in a folder located at a lower level hierarchy among folders pertaining to a certain address, the message can be immediately read from a specified folder by setting to a shortcut folder a folder into which a desired information message is stored.

DETAILED DESCRIPTION OF THE PREFERRED EMBODIMENTS

Figure 1:
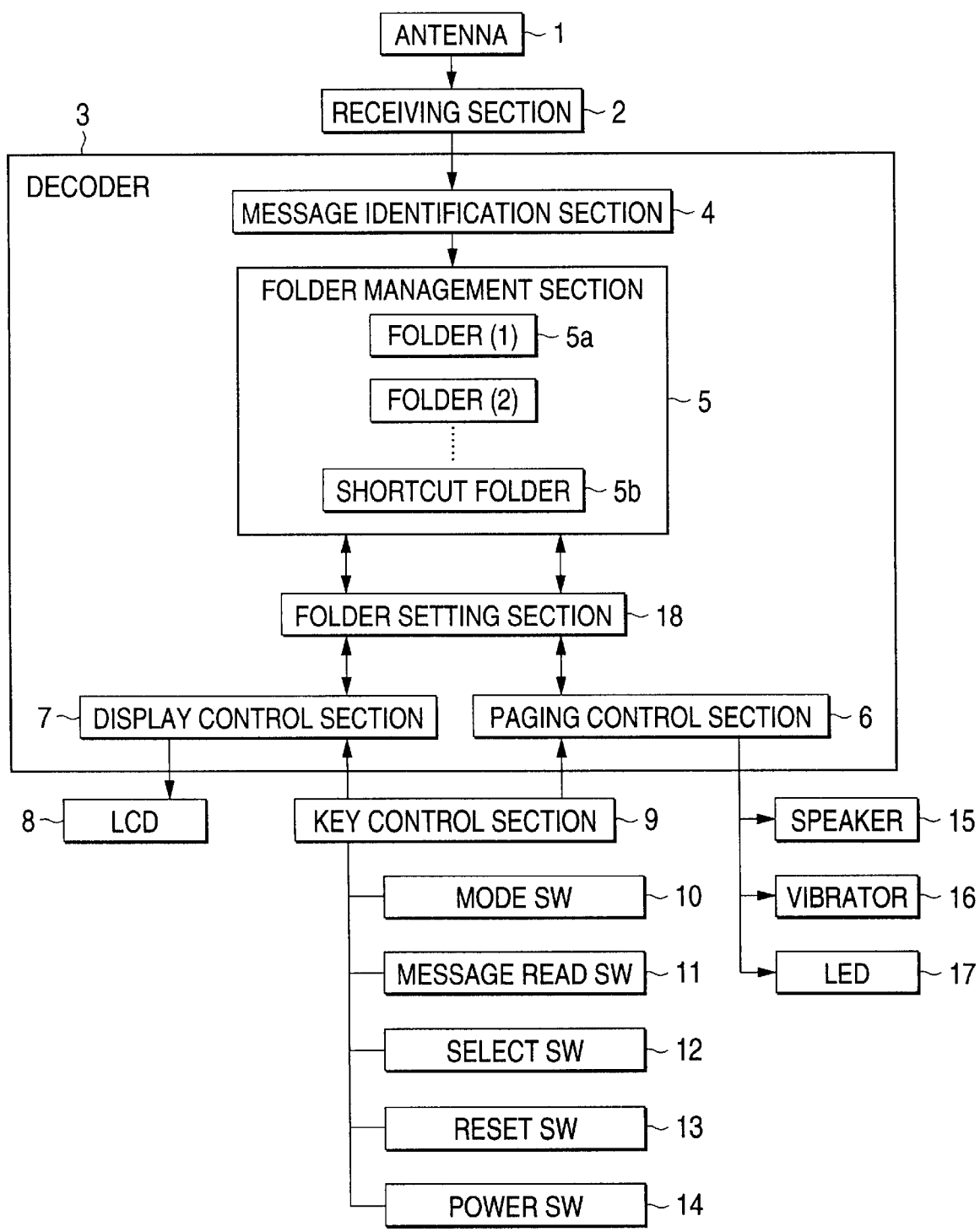
FIG. 1 is a block diagram showing the configuration of a radio pager according to an embodiment of the present invention.

An embodiment of the present invention will now be described by reference to FIGS. 1 through 5. FIG. 1 is a block diagram showing the configuration of a radio pager according to an embodiment of the present invention. In FIG. 1, reference numeral 1 designates an antenna which receives a selecting paging signal; 2 designates a receiving section which amplifies and demodulates the selective paging signal and converts the thus-demodulated paging signal into a digital signal; and 3 designates a decoder which decodes the selective paging digital signal. The decoder 3 comprises a message identification section 4 which classifies messages according to addresses and stores the thus-classified messages into a corresponding folder; a folder management section 5 which manages the messages of an individual folder for each level in a hierarchy; a paging control section 6 which drives a speaker 15, a vibrator 16, and an LED (light-emitting diode) 17; and a folder setting section 18 which controls and sets the relationship between the individual folders of the folder management section 5 and the paging control section 6 and the relationship between the individual folders and the display control section 7. The folders of the folder management section 5 can be set as shortcut folders 5b instead of as ordinary folders 5a through setting of the folder setting section 18. Reference numeral 9 designates a key control section which imparts an instruction to the paging control section 6 and the display control section 7 by way of an input from the outside. The key control section 9 controls a mode switch 10, a message read switch 11, a select switch 12, a reset switch 13, a power switch 14, or the like.

Figure 2:
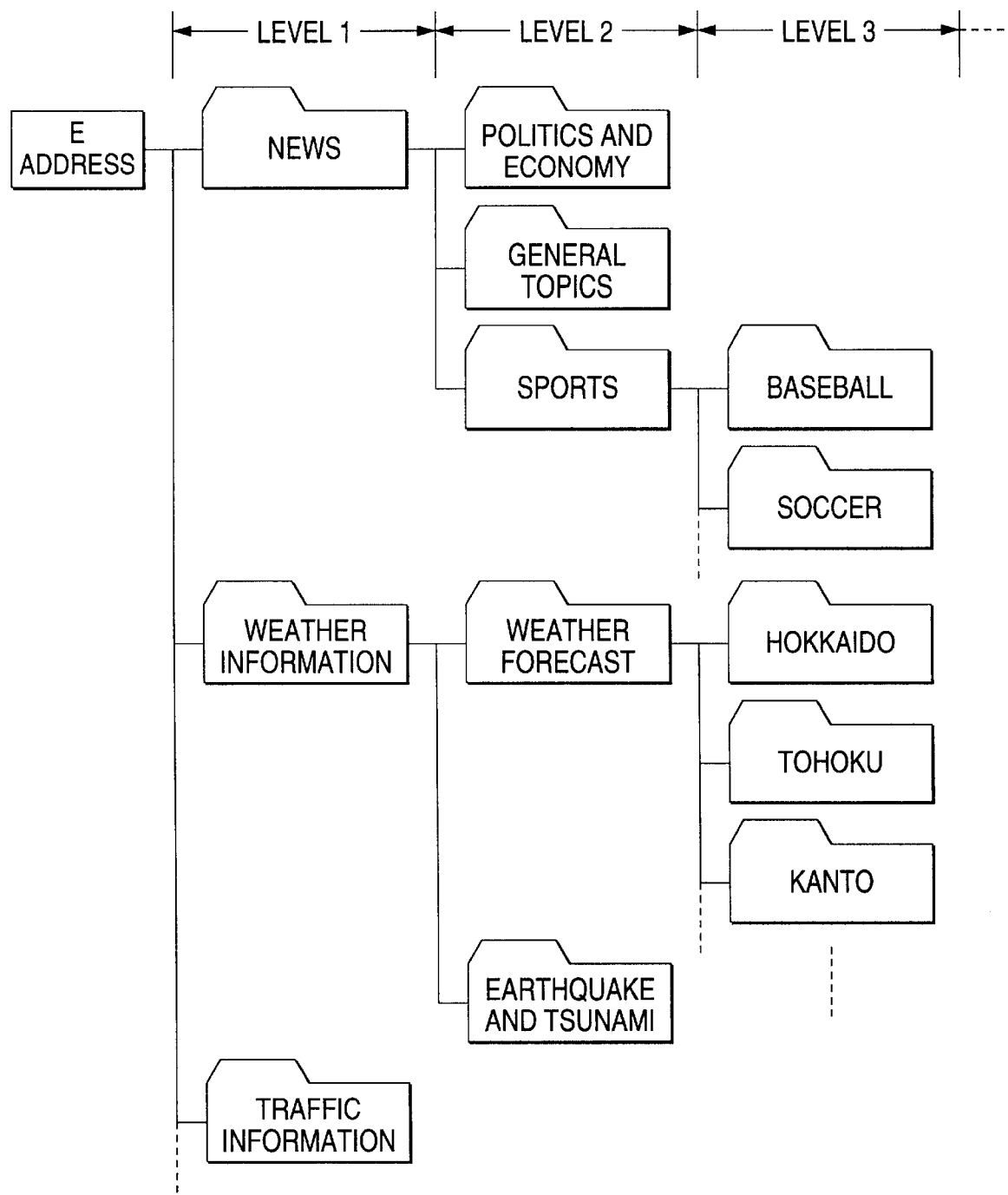
FIG. 2 is a schematic representation showing a hierarchical structure of folders of the folder management section according to of the embodiment of the present invention.
Figure 3:
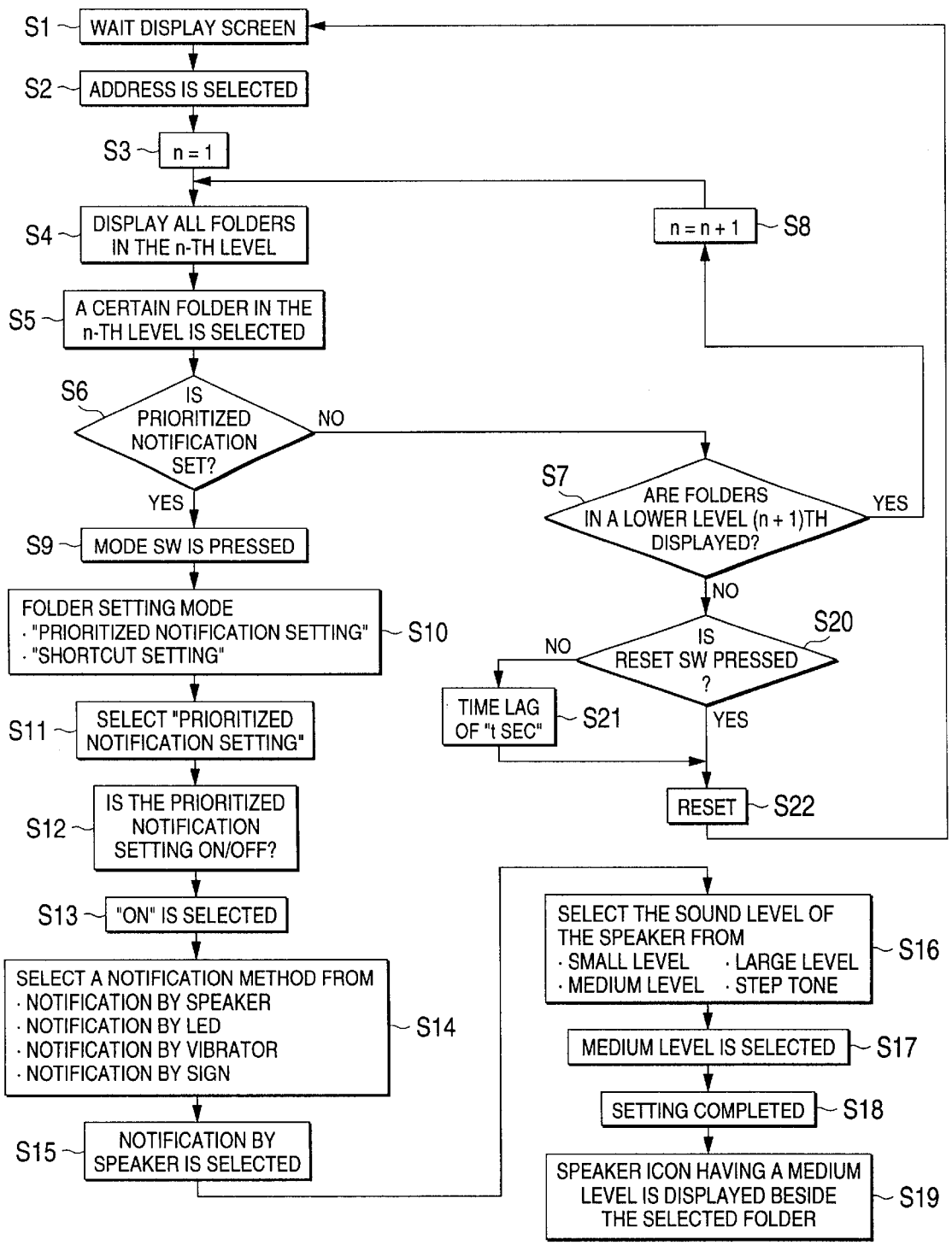
FIG. 3 is a flowchart showing processing related to a setting for prioritized notification of a specified folder according to the present embodiment.
Figure 4:
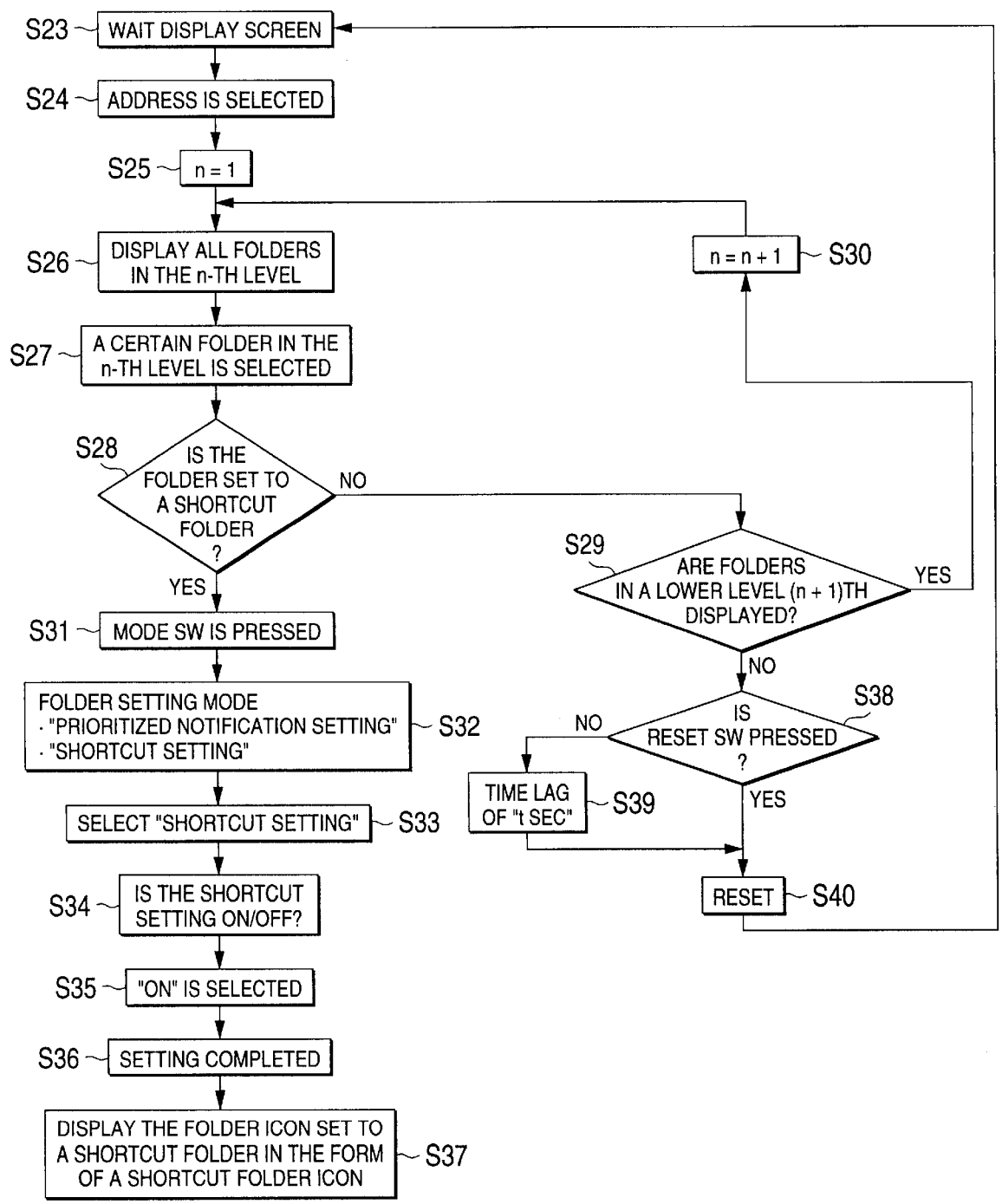
FIG. 4 is a flowchart showing processing related to a setting of a shortcut folder according to the present embodiment.
Figure 5:
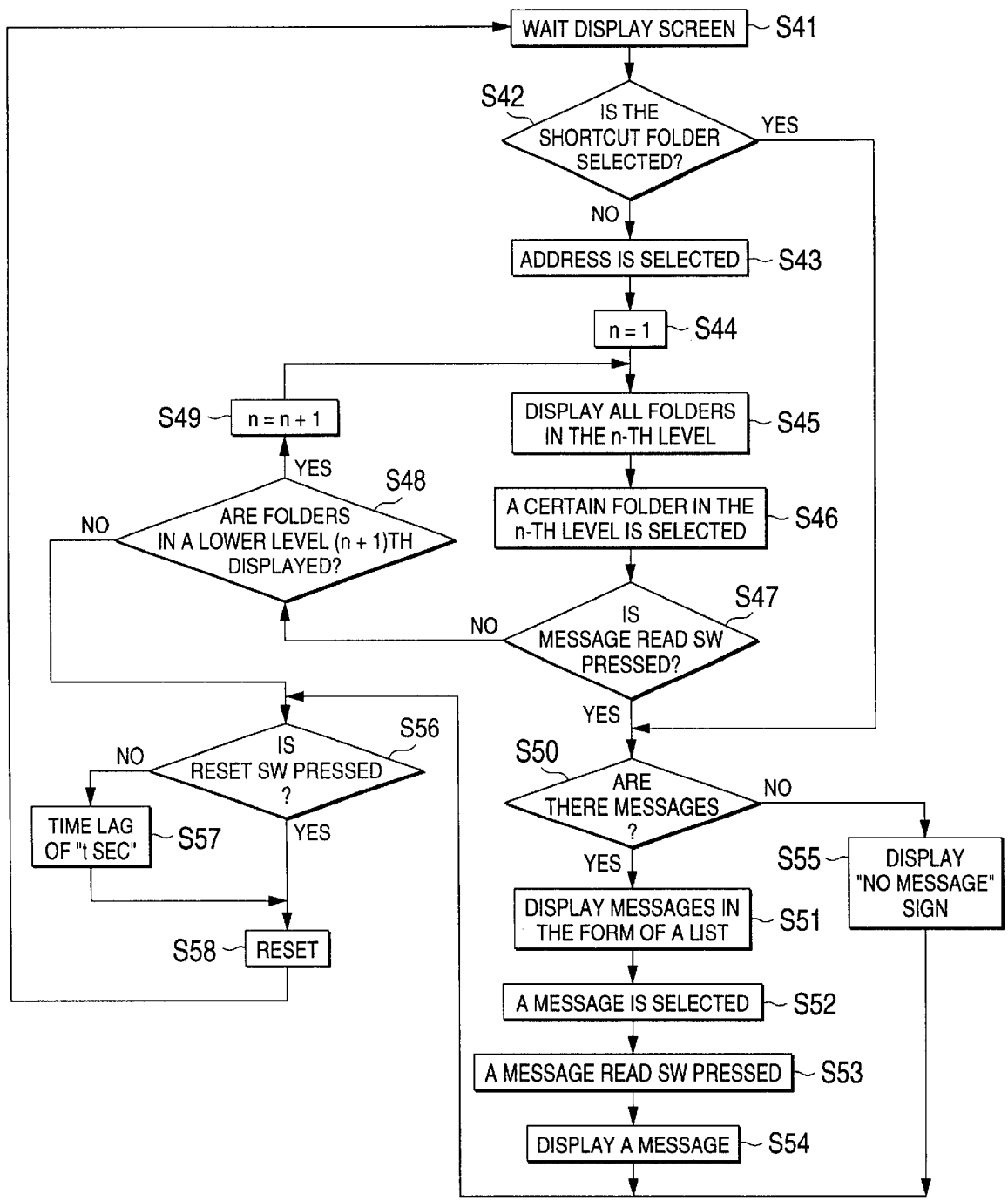
FIG. 5 is a flowchart showing processing for reading a message according to the embodiment.

FIG. 2 is a schematic representation showing a hierarchical structure of folders of the folder management section 5 according to the embodiment of the present invention. FIG. 3 is a flowchart showing processing related to a setting for prioritized notification of a specified folder according to the present embodiment. FIG. 4 is a flowchart showing processing related to a setting of a shortcut folder according to the present embodiment. FIG. 5 is a flowchart showing processing for reading a message according to the embodiment.

The operation of the radio pager having the foregoing configuration will now be described. First, a selective paging signal received by the antenna 1 is amplified and demodulated by the receiving section 2. Further, the decoder 3 converts the demodulated signal into a readable digital signal. The thus-converted digital signal comprises the type of a signal, an address, an information flag, the title of information, and the main body of an information message or the like. The message identification section 4 of the decoder 3 extracts the type of the signal and determines whether the message is a message for paging the user or a message delivered by way of the information delivery service. The message is classified to a corresponding address and stored in that address. In a case where the message is one delivered by way of the information delivery service, the message identification section 4 detects a corresponding folder on the basis of the information flag and the title of the information. The main part of the message information is stored into that folder. As shown in FIG. 2, an information message related to, for example, soccer, is classified into a folder entitled "News" in the highest hierarchical level 1 in an "E address." Next, the message is classified into a folder entitled "Sports" in lower level 2, and the message is stored into a folder entitled "Soccer" in lower level 3.

The folder management section 5 stores and manages all the messages stored in several hierarchical folders as mentioned previously. The folder setting section 18 controls and sets the relationship between the individual folders of the folder management section 5 and the paging control section 6, as well as the relationship between the individual folders and the display control section 7. The folder setting section 18 can be set in such a way that, when a new message is stored in at least one of a plurality of folders, the paging control section 6 is activated to invoke the message in a prioritized manner or the display controls section 7 is caused to notify the user of the arrival of the message by indication. Further, so long as, among the folders of the folder management section 5, a folder into which a desired information message is stored is set as a shortcut folder by means of the folder setting section 18, so that a message stored in a specified folder can be immediately read.

Processing related to prioritized notification setting for the specified folder will now be described by reference to FIG. 3. From a wait display screen (step S1) there is selected an address (step S2). A folder to which a prioritized notification is desired to be set is retrieved and selected (steps S3 to S8). For example, as shown in FIG. 2, an "E Address" is selected, and a "News" folder is selected from the highest level 1. A "Sports" folder is selected from lower level 2. A "Baseball" folder is selected from further lower level 3. To abort the folder selection operation, a reset switch 13 is pressed (Y in step S20) or the radio pager is left as is for "t" seconds (N in step S20, and S21), whereby the radio pager is reset (step S22). The screen is restored to the wait display screen (step S1). Next, the mode switch 10 is pressed (step S9), thus bringing the radio pager into a folder setting mode (step S10). A menu item "Prioritized Notification Setting" is selected (step S11). From a select screen regarding the prioritized notification setting menu: ON/OFF ? (step S12) there is selected a sign ON (step S13). In a prioritized notification setting screen (step S14), the user selects any one of methods: that is, "Notification by sound" (in which the arrival of a message is indicated by sound from the speaker 15), "Notification by vibration" (in which the arrival of a message is indicated by actuation of the vibrator 16), "Notification by an LED" (in which the arrival of a message is indicated by flashing of the LED 17), and "Notification by sign" (in which the arrival of a message is indicated by displaying on the LCD 18 a character or a symbol representing the arrival of a message). In a case where any one of the methods "Notification by sound", "Notification by vibration", and "Notification by an LED" is selected, the paging control section 6 is set so as to control one of the speaker 15, the vibrator 16, and the LED 17 and to notify the user of the arrival of a message in a prioritized manner only when a new message is stored into a specified folder. In contrast, when the method "Notification by sign" is selected, the display control section 7 is set so as to notify the user of the arrival of a message in a prioritized manner by indicating on the LCD 18 a character or a sign representing the arrival of a message when a new message is stored in a specified folder. After completion of setting of prioritized notification, a mark is indicated beside an icon representing a specified folder, wherein the mark represents that prioritized notification is effected by means of any one of the speaker 15, the vibrator 16, the LED 17, and the LCD 18. If "Notification by sound" is selected, a volume setting indication is displayed, thus enabling selection of a volume level. After selection of the volume level, there is indicated a speaker icon which represents a beeping action at a selected volume. For example, "Notification by sound" is selected (step S15), and during a volume setting operation (step S16) a medium sound level is selected (step S17). The volume setting is completed (step S18). As a result, a speaker icon representing an intermediate volume level is indicated beside the specified folder (step S19).

Processing related to setting of a shortcut folder will be described by reference to FIG. 4. From a wait display screen (step S23) there is selected an address (step S24). A folder desired to be set as a shortcut folder is retrieved and selected (steps S25 to S30). For example, as shown in FIG. 2, the "E Address" is selected, and the "News" folder is selected from the highest level 1. The "Sports" folder is selected from lower level 2. The "Baseball" folder is selected from further lower level 3. To abort the folder selection operation, the reset switch 13 is pressed (Y in step S38) or the radio pager is left as is for "t" seconds (N in step S38, and S39), whereby the radio pager is reset (step S40). The screen is restored to the wait display screen (step S23). Next, the mode switch 10 is pressed (step S31), thus bringing the radio pager into a folder setting mode (step S32). The menu item "Prioritized Notification Setting" is selected (step S33). From the select screen regarding the prioritized notification setting menu: ON/OFF ? (step S34) there is selected a sign ON (step S35). The shortcut setting is completed (step S36), and the icon of the specified folder changes to another icon representing that the specified folder has the status of a shortcut folder (step S37).

Taking as an example reading of an information message from the "Baseball folder" included in the "E address" provided in FIG. 2, reading of the message in a case where the "Baseball" folder is set as an ordinary folder and reading of the same where the "Baseball" folder is set as a shortcut folder will be described by-reference to FIG. 5. First, when the "Baseball" folder is set to an ordinary folder, the "E address" is selected on the wait display screen (step S41). Next, the "News" folder is selected from the highest level 1, and the "Sports" folder is selected from the lower level 2. The "Baseball" folder is then selected from the further lower level 3. The message read switch 11 is pressed (this operation corresponds to N in step S42, and S43 to S49). As a result, several information messages regarding baseball are displayed in the form of a list (step S51). For example, a message "Result of Professional Baseball: Giants vs. Hanshin . . . " is selected (step S52). The message read switch 11 is pressed (step S53), to thereby display the information message (step S54). Here, when the folder selection operation is to be aborted or when the reading of the information message has been completed, the reset switch 13 is pressed (Y in step S56) or the radio pager is left as is for "t" seconds (N in step S56, and S57). The radio pager is reset (step S58), and the screen is restored to the wait display screen (step S41). Next, in a case where the "Baseball" folder is set to a shortcut folder, the icon of the shortcut folder 5b is selected (Y in step S42) on the wait display screen (step S41). If there is a message (step S50), several information messages regarding baseball are displayed in the form of a list (step S51). "Result of Professional Baseball: Giants vs. Hanshin . . . " is selected (step S52), and the message read switch 11 is pressed (step S53). As a result, the information message is displayed (step S54). In either state, in the event of no message being stored in the selected folder, an indication "No Message" is displayed (step S55).

As has been described above, according to the present embodiment, at least one folder is specified by means of the folder setting section 18. The folder setting section 18 is set in such a way as to cause the paging control section 6 to invoke a new message in a prioritized manner or to cause the display control section 7 to display a message arrival indication in a prioritized manner when the new message is stored in the thus-specified folder. Further, a folder into which a desired information message is stored is set as a shortcut folder, thus enabling the user to immediately become aware of the arrival of a desired information message as well as to promptly read the message.

As is obvious from the foregoing embodiment, the radio pager is arranged so as to cause the paging control section to perform a paging operation in a prioritized manner or to cause the display control section to notify the user of the arrival of a message by displaying a message arrival indication, only when a new message is stored in a specified folder. As a result, the user can immediately become aware of the arrival of a desired information message. Further, so long as a folder into which desired information is stored is set as a shortcut folder, a desired information message can be immediately read without involving laborious operations such as retrieval of folders.

What is claimed is:

1. A radio pager comprising:

a message identification section for classifying and dividing according to addresses messages delivered by way of an information delivery service, said messages including an information flag and a title, and wherein said message identification section classifies and divides said messages based on at least one of said information flag and said title;

a folder management section which stores the thus classified and divided messages into individual specified folders and manages the messages of an individual folder for each level in a hierarchy;

means for notifying the user of the arrival of a message; and a folder setting section which sets said pager in such a way as to notify the user, in a predetermined and prioritized manner, of the arrival of an incoming message at a preselected folder, said notification being selectively accomplished by one of said paging control section invoking the message in a prioritized manner and said display control section displaying a message arrival indication in a prioritized manner, wherein when a desired information message is stored in a folder located at a lower level hierarchy among folders pertaining to a certain address, the desired information message stored in a specified folder can be immediately read by setting to a shortcut folder a folder into which a desired message is stored by way of said folder setting section.

* * * * *